(12) United States Patent
Steidle

(10) Patent No.: US 11,378,109 B2
(45) Date of Patent: Jul. 5, 2022

(54) ADAPTIVE FRICTION MINIMIZATION FOR ELECTROHYDRAULIC ACTUATORS

(71) Applicant: ZF Friedrichshafen AG, Friedrichshafen (DE)

(72) Inventor: Sebastian Steidle, Deggenhausertal (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 17/215,220

(22) Filed: Mar. 29, 2021

(65) Prior Publication Data

US 2021/0332838 A1  Oct. 28, 2021

(30) Foreign Application Priority Data

Apr. 23, 2020 (DE) ...................... 10 2020 205 139.9

(51) Int. Cl.
*F15B 21/08* (2006.01)
*F15B 13/044* (2006.01)

(52) U.S. Cl.
CPC .......... *F15B 21/087* (2013.01); *F15B 13/044* (2013.01); *F15B 2211/526* (2013.01); *F15B 2211/6309* (2013.01); *F15B 2211/6653* (2013.01)

(58) Field of Classification Search
CPC .............................. F15B 21/087; F15B 21/008
See application file for complete search history.

(56) References Cited

U.S. PATENT DOCUMENTS

| 4,750,523 A * | 6/1988 | Crouse ................... F16L 55/04 137/1 |
| 5,526,690 A * | 6/1996 | Louie ..................... G01M 3/243 138/26 |
| 5,785,815 A * | 7/1998 | Munch .................... D21F 1/065 137/14 |
| 8,337,179 B2 * | 12/2012 | Boock ................... F15B 21/008 417/540 |
| 2006/0130919 A1 * | 6/2006 | Ehmann ................ F15B 21/008 138/30 |
| 2011/0000465 A1 | 1/2011 | Stoecklein et al. |
| 2011/0302976 A1 | 12/2011 | Keintzel et al. |

FOREIGN PATENT DOCUMENTS

| AT | 507 087 A4 | 2/2010 |
| DE | 103 16 946 A1 | 10/2004 |
| DE | 10 2005 036 190 A1 | 2/2007 |
| DE | 10 2016 001 753 A1 | 8/2017 |

OTHER PUBLICATIONS

German Search Report Corresponding to 10 2020 205 139.9 dated Feb. 1, 2021.

* cited by examiner

*Primary Examiner* — Thomas E Lazo
(74) *Attorney, Agent, or Firm* — Finch & Maloney PLLC; Michael J. Bujold; Jay S. Franklin

(57) ABSTRACT

A method of controlling an electro-hydraulic actuator (101). An electric voltage applied to the actuator (101) is established by superimposing a control variable with an oscillatory signal. A hydraulic pressure, influenced by the actuator (101), is measured. The oscillatory signal is adapted as a function of the measured hydraulic pressure.

9 Claims, 1 Drawing Sheet

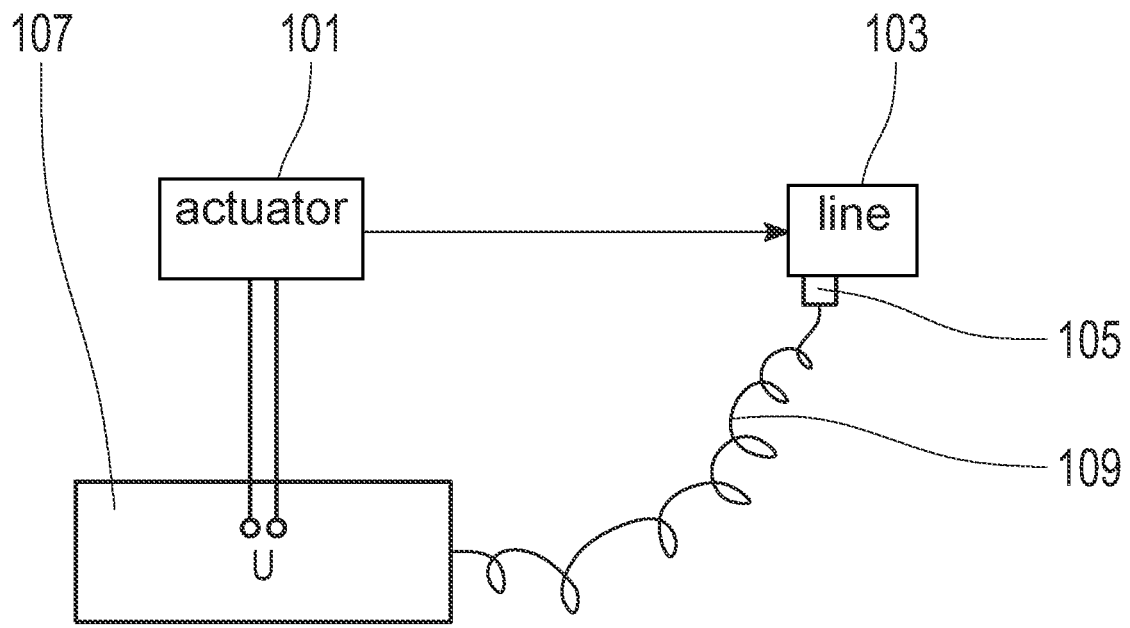

ADAPTIVE FRICTION MINIMIZATION FOR ELECTROHYDRAULIC ACTUATORS

This application claims priority from German patent application serial no. 10 2020 205 139.9 filed Apr. 23, 2020.

FIELD OF THE INVENTION

The invention relates to a control method, an arrangement, a computer program and a data processing device for adaptive friction minimization of electro-hydraulic actuators.

BACKGROUND OF THE INVENTION

It is known from the prior art to apply electrical oscillation signals to electro-hydraulic actuators. This reduces the mechanical friction in the actuator. However, oscillations in a hydraulic system can result in undesired effects. These are detected on a test bench and stored in a control unit.

Since the conditions that occur on the test bench can only be reproduced approximately in practice, the actuator must be actuated with a safety margin. This ensures that in the case of conditions in which critical system states can occur, a safety margin remains. That is a disadvantage, since the full performance potential of the actuator cannot be exploited.

SUMMARY OF THE INVENTION

The purpose of the present invention is to improve the actuation of an electro-hydraulic actuator. This objective is achieved by a control method, an arrangement, a computer program and a data processing device according to the independent claim(s). Preferred further developments are contained in the subordinate claims and emerge from the following description and from the example embodiment illustrated in the sole FIGURE.

The method according to the invention involves the use of an electro-hydraulic actuator. This is an actuator designed to influence a hydraulic pressure as a function of an electric voltage applied to the actuator. Between the electric voltage and the hydraulic pressure there is a functional relationship. The hydraulic pressure is a function of one or more parameters. These parameters include the electric voltage. In particular, the hydraulic pressure can depend solely on the electric voltage.

To reduce mechanical friction in the actuator, the electric voltage applied to the actuator is subjected to oscillations, as described earlier. This means that the voltage is established by superimposing a variable, called the control variable in what follows, with an oscillatory signal.

An oscillatory signal is a variable which is subject to a repeated fluctuation in time, i.e. a deviation from a mean value. The value repeatedly deviates from a mean value. The latter is preferably zero. For example, the oscillatory signal can be a sinusoidal oscillation.

The oscillatory signal superimposed on the control variable is preferably provided in such manner that no interference occurs between the control variable and the oscillatory signal, which would cancel out the oscillatory signal. Such cancellation of the oscillatory signal would have the result that the electric voltage established by the superimposition would not fluctuate with time. Conversely, this means that the electric voltage is an oscillation.

By virtue of the oscillating electric voltage, the actuator is caused to oscillate mechanically. On the one hand this reduces the mechanical friction of the actuator. On the other hand, the hydraulic pressure influenced by the actuator can also be excited into oscillation.

In order to prevent the oscillations of the hydraulic pressure from giving rise to undesired effects, the hydraulic pressure is measured. As a function of that, according to the invention the oscillatory signal is adapted. The adapted oscillatory signal differs from the oscillatory signal which is superimposed on the control variable before the adaptation.

Since the oscillations of the hydraulic pressure predominantly result in undesired effects, in a preferred further development the oscillation of the hydraulic pressure is measured. In particular, in a further development an amplitude, a frequency and/or a signal shape of the hydraulic pressure can be measured.

Preferably the method is developed further in such manner that the oscillatory signal is adapted as a function of an amplitude, a frequency and/or a signal shape of the measured hydraulic pressure. The amplitude, frequency and/or signal shape can be determined from measurements of the hydraulic pressure, or measured directly as described above.

In a further preferred development, a hydraulic pressure is determined which is to be expected as a function of the control variable and/or the oscillatory signal. The determination of the hydraulic pressure to be expected can be done computationally or by simulation.

According to this further development, the oscillatory signal is adapted as a function of deviations of the measured hydraulic pressure from the expected hydraulic pressure. This implies that in a further process step the deviations are determined. Preferably, the adaptation is carried out in such manner that the deviations are minimized. This serves to minimize the influence of disturbance-generating variables.

An arrangement according to the invention comprises an electro-hydraulic actuator, a hydraulic line, a sensor and a data processing device. As described earlier the actuator is designed to influence a fluid pressure in the hydraulic line as a function of an electric voltage specified by the data processing device.

The electric voltage specified by the data processing device is applied to the actuator. As a function thereof, as described above, the actuator influences the pressure of the fluid. In particular, the actuator can be designed to generate the fluid pressure as a function of the electric voltage. Alternatively, an actuator designed as a pressure regulating valve can possibly be considered. This regulates the level of a fluid pressure produced by another actuator.

The arrangement can be for example part of an automatic transmission. The individual gears of the transmission are engaged by means of hydraulically actuated clutches and/or brakes. In this case at least one brake or clutch is actuated by the fluid pressure influenced by the actuator.

The arrangement according to the invention is designed to carry out the method according to the invention or a preferred further development thereof. In particular, the sensor is designed to measure the fluid pressure. A corresponding signal from the sensor is sent to the data processing device as an input signal. According to the invention, the latter is designed to adapt the oscillatory signal as a function of the pressure measured, as described above.

A data processing device according to the invention is designed or set up to carry out the method according to the invention or a preferred further development thereof. Preferably, the data processing device is designed or set up so as to be suitable for using the arrangement according to the invention.

A computer program according to the invention is designed to enable a data processing device to carry out the method according to the invention or a preferred further development thereof. The method is carried out by the data processing device, in that the computer program is implemented in the data processing device.

BRIEF DESCRIPTION OF THE DRAWING

A preferred example embodiment of the invention is illustrated in a sole FIGURE. Specifically, the sole FIGURE shows a hydraulic system.

DETAILED DESCRIPTION OF THE PREFERRED EMBODIMENTS

The system shown in the sole FIGURE comprises an electro-hydraulic actuator 101, a hydraulic line 103, a pressure sensor 105, a control unit 107 and a signal line 109.

A voltage U is applied to the actuator 101. The actuator 101 is controlled by way of the voltage U.

The actuator 101 influences a hydraulic pressure prevailing in a hydraulic line 103. This takes place as a function of the voltage U. Thus, the hydraulic pressure depends on the voltage U. To reduce the mechanical friction occurring in the actuator 101, an oscillation is imposed on the voltage.

The hydraulic pressure prevailing in the hydraulic line 103 is measured by the pressure sensor 105. Its measured values are evaluated and processed further by the control unit 107. For that purpose the pressure sensor 105 is connected to the control unit 107 for signal transmission by way of the signal line 109.

The control unit 107 analyses a pressure signal transmitted to it by the pressure sensor 105 via the signal line 109 for anomalies. If anomalies occur, the control unit 107 adapts the oscillation imposed on the voltage U as necessary.

INDEXES

101 Actuator
103 Hydraulic line
105 Pressure sensor
107 Control unit
109 Signal line
U Voltage

The invention claimed is:

1. A method of controlling an electro-hydraulic actuator, the method comprising:
    establishing an electric voltage applied to the actuator by superimposing an oscillatory signal on a control variable, and the superimposed oscillatory signal causing the actuator to oscillate mechanically and thereby reducing mechanical friction occurring in the actuator;
    measuring a hydraulic pressure influenced by the actuator; and
    adapting the oscillatory signal as a function of the measured hydraulic pressure.

2. The control method according to claim 1, further comprising measuring an oscillation of the hydraulic pressure.

3. The control method according to claim 2, further comprising adapting the oscillatory signal as a function of at least one of an amplitude, a frequency and a signal shape of the measured hydraulic pressure.

4. The control method according to claim 1, further comprising adapting at least one of an amplitude, a frequency and a signal shape of the oscillatory signal.

5. The control method according to claim 1, further comprising determining a hydraulic pressure to be expected as a function of at least one of the control variable and the oscillatory signal; and
    adapting the oscillatory signal as a function of deviation of the measured hydraulic pressure from the hydraulic pressure to be expected.

6. A data processing device, which is configured to carry out the method according to claim 1.

7. A computer program, which is configured to enable a data processing device to carry out the method according to claim 1.

8. A method of controlling an electro-hydraulic actuator, the method comprising:
    establishing an electric voltage applied to the actuator by superimposing an oscillatory signal on a control variable, and the superimposed oscillatory signal being designed to reduce mechanical friction, occurring in the actuator, without any interference occurring between the control variable and the oscillatory signal so that the electric voltage, established by the superimposition, fluctuates with time;
    measuring a hydraulic pressure influenced by the actuator; and
    adapting the oscillatory signal as a function of the measured hydraulic pressure.

9. A method of controlling an electro-hydraulic actuator, the method comprising:
    establishing an electric voltage applied to the actuator by superimposing an oscillatory signal on a control variable, and the superimposed oscillatory signal being designed to reduce mechanical friction, occurring in the actuator, without any interference occurring between the control variable and the oscillatory signal so that the electric voltage, established by the superimposition, fluctuates with time, and the oscillating electric voltage causing the actuator to oscillate mechanically so as to reduce mechanical friction of the actuator as well as excite the actuator into oscillation;
    measuring a hydraulic pressure influenced by the actuator; and
    adapting the oscillatory signal as a function of the measured hydraulic pressure.

* * * * *